United States Patent
Torres et al.

(10) Patent No.: US 7,552,070 B2
(45) Date of Patent: Jun. 23, 2009

(54) SYSTEM AND METHOD OF PLANNING A FUNERAL

(75) Inventors: Efrain Torres, Cincinnati, OH (US); Rachel Elizabeth Myers, Cincinnati, OH (US); Randall Scott Salatin, Greensburg, IN (US)

(73) Assignee: Forethought Financial Services, Inc., Batesville, IN (US)

( * ) Notice: Subject to any disclaimer, the term of this patent is extended or adjusted under 35 U.S.C. 154(b) by 614 days.

(21) Appl. No.: 09/827,803

(22) Filed: Apr. 6, 2001

(65) Prior Publication Data

US 2002/0004757 A1    Jan. 10, 2002

Related U.S. Application Data

(60) Provisional application No. 60/216,567, filed on Jul. 7, 2000.

(51) Int. Cl.
*G06Q 30/00* (2006.01)

(52) U.S. Cl. .................... 705/26; 705/27; 705/1

(58) Field of Classification Search .......... 705/26–27, 705/50, 35, 37, 51, 1; 709/219; 345/760; *G06F 17/60*
See application file for complete search history.

(56) References Cited

U.S. PATENT DOCUMENTS

| | | | | | |
|---|---|---|---|---|---|
| 5,696,366 | A | * | 12/1997 | Ziarno | 235/380 |
| 5,953,400 | A | * | 9/1999 | Rosenthal et al. | 379/202.01 |
| 5,983,200 | A | * | 11/1999 | Slotznick | 705/26 |
| 6,006,265 | A | * | 12/1999 | Rangan et al. | 709/226 |
| 6,108,640 | A | * | 8/2000 | Slotznick | 705/26 |
| 6,151,571 | A | * | 11/2000 | Pertrushin | 704/209 |
| 6,199,034 | B1 | * | 3/2001 | Wical | 704/9 |
| 6,275,806 | B1 | * | 8/2001 | Pertrushin | 704/272 |
| 6,340,978 | B1 | * | 1/2002 | Mindrum | 715/764 |
| 6,343,317 | B1 | * | 1/2002 | Glorikian | 709/218 |
| 6,430,542 | B1 | * | 8/2002 | Moran | 705/36 |
| 6,487,545 | B1 | * | 11/2002 | Wical | 706/45 |
| 6,556,983 | B1 | * | 4/2003 | Altschuler et al. | 706/55 |
| 6,609,106 | B1 | * | 8/2003 | Robertson | 705/26 |
| 6,631,397 | B1 | * | 10/2003 | Satomi et al. | 709/203 |
| 6,747,755 | B1 | * | 6/2004 | Satomi et al. | 358/1.15 |

(Continued)

FOREIGN PATENT DOCUMENTS

JP    2001306723 A  *  11/2001

(Continued)

OTHER PUBLICATIONS http://web.archive.org/web/*/www.buycaskets.com, <retrieved via WayBackMachine.org, retrieved on Dec. 10, 2007>.*

(Continued)

*Primary Examiner*—Yogesh C Garg
(74) *Attorney, Agent, or Firm*—Wood, Herron & Evans, LLP

(57) ABSTRACT

An apparatus, computer-implemented method and program product to arrange and fund a funeral or other memorial service. A program receives user input requesting information associated with funeral products, services and homes. The program associates the user input with a budgetary, profile, home locator, or step-based parameter. Each parameter logically links to an information field stored within the database. A central web server retrieves information associated with the parameter for inclusion within a funeral plan.

67 Claims, 6 Drawing Sheets

U.S. PATENT DOCUMENTS

| | | | |
|---|---|---|---|
| 2001/0032093 A1* | 10/2001 | Segal | 705/1 |
| 2001/0056349 A1* | 12/2001 | St. John | 704/270 |
| 2002/0002460 A1* | 1/2002 | Pertrushin | 704/270 |
| 2002/0004757 A1 | 1/2002 | Torres et al. | |
| 2002/0010587 A1* | 1/2002 | Pertrushin | 704/275 |
| 2002/0046046 A1* | 4/2002 | Barrott et al. | 705/1 |
| 2002/0049831 A1 | 4/2002 | Plantner et al. | |
| 2003/0023444 A1* | 1/2003 | St. John | 704/270.1 |
| 2003/0208483 A1* | 11/2003 | Satomi et al. | 707/5 |
| 2003/0212611 A1* | 11/2003 | Barrott et al. | 705/27 |

FOREIGN PATENT DOCUMENTS

| | | |
|---|---|---|
| WO | WO 01/29736 | 4/2001 |

OTHER PUBLICATIONS

Eburial.com Welcome, www.eburial.com/index2.html, Nov. 15, 2000.

Boyer, *The Cincinnati Enquirer*, Software Eases Funeral Planning, Business Section, p. 1B, Jul. 15, 1999.

*Yahoo! Canada Sports*, http://ca.yahoo.com/Society and Culture/Cultures and Groups/Seniors/, Nov. 21, 2000.

*How to Arrange a Funeral*, http://www.funeralwise.com/Arrange/SomeoneDied.html, Nov. 15, 2000.

Welcome to Plan Funeral.com, http:/www.planfuneral.com/scripts/services.cfm, Nov. 15, 2000.

TheFuneralCompany.com, http://www.thefuneralcompany.com/, Nov. 15, 2000.

*Perfect Funeral*, http://www.perfectfuneral.com/, Nov. 15, 2000.

Funeral plan.com, http://www.funeralplan.com/, Nov. 15, 2000.

*Donations*, http://www.plan4ever.com/donations/, Nov. 15, 2000.

Discounturns.com, http://store.yahoo.com/discounturns/index.html, Nov. 15, 2000.

Rob and Steve Snell, *Make More With Your Yahoo Store!*, http://www.robsnell.com/, Aug. 2002.

* cited by examiner

SYSTEM AND METHOD OF PLANNING A FUNERAL

This application claims the benefit of U.S. Provisional Patent App. Ser. No. 60/216,567 filed Jul. 7, 2000, which is hereby incorporated by reference in its entirety.

FIELD OF THE INVENTION

This invention relates generally to the death care industry, and more particularly to funerals and other memorial services and methods of planning the same.

BACKGROUND OF THE INVENTION

Upon the death of a family member, surviving loved ones must make a number of decisions in a relatively short time. Too often a bereaved loved one feels pressured and overwhelmed by memorial preparations. Exemplary memorial decisions encompass ceremony preferences, financial arrangements, casket or urn selections, etc. Other considerations relate to transportation, floral displays, as well as "personalizing" products and services. For instance, clients routinely customize materials, finishes, corner adornments and interiors of caskets to honor loved ones. Likewise, "memorial items" or keepsakes may be tastefully incorporated into aspects of a memorial service. While such services and personal touches facilitate the healing processes, they often represent difficult choices for bereaved loved ones.

In consideration of the above, the trend of preplanning one's own funeral has become increasingly common. Preplanning ensures that the wishes of a planner are recorded and fulfilled. The practice is especially desirable in discordant family scenarios where children may pointedly disagree as to memorial details. Thus, death care providers expend great resources to develop methods and products to encourage and facilitate preplanning.

Funeral plans and preplans are conventionally created in an "arrangement conference." In such a conference, a funeral director meets with a pre-planner or surviving loved one of the deceased. The conference is typically held in the funeral home of the funeral director, who describes and discusses various funeral products, services and costs. The funeral director may use visual aids, such as a product catalog, product display board and a casket selection room to illustrate the products available to the customer. Similar catalogs may be employed to give a sense for the services offered by a funeral.

While many family members and pre-planners prefer the structure and personal attention of an arrangement conference, others are uncomfortable meeting a funeral director in person. Some clients may feel pressured in a personal interview, or even concerned that they are wasting a director's time with indecisiveness. The demanding schedules of other clients do not allow for adequate time to meet with a funeral director or research arrangements thoroughly. Still other clients struggle with the initial decision of choosing a funeral home suited to meet their unique needs.

Some death care providers attempt to meet client insecurities and busy schedules by tapping into Internet resources. Commercial Internet applications have become ubiquitous in nearly every other industry, and funerary providers likewise recognize advantages inherent to the technology. For instance, digitized listings of funeral products and services are displayed on Internet web pages maintained by funeral suppliers and providers. Such web pages allow browsers limited exposure to select products and other aspects of a memorial process. Web pages can familiarize clients with select products and services prior to an arrangement conference. However, while they can facilitate the planning process, conventional websites are not comprehensive or integrated and still require clients to attend personal arrangement conferences.

Consequently, what is needed is a method of arranging a memorial in a manner that allows for more convenient, thoughtful and comprehensive planning than has heretofore been possible.

SUMMARY OF THE INVENTION

The invention successfully incorporates Internet-based technology to provide a systematic method of planning a funeral or other memorial service online. In one embodiment, a program consistent with the invention receives user input from a client. The user input requests pricing information on a product, service, or funeral home selected from among a plurality of homes. The user input may be associated, for example, with a budgetary, profile, or step-based parameter. Each parameter is typically associated with respective collections of goods, services and other data. A central server retrieves the pricing information from a database and outputs it to a user. The information is typically associated with funerary products and services offered by the funeral homes.

In another embodiment consistent with the invention, user input is forwarded from a funeral home website to a central server. In such a scenario, the program may only retrieve a subset of the database that corresponds to products and services affiliated with the funeral home website. In still another embodiment, a funeral plan may be funded online, as well. Such a method typically involves arranging and communicating a method, amount and date of payment to a funeral home or vendor.

These and other features and advantages of the present invention will become more readily apparent during the following detailed description taken in conjunction with the drawings herein, in which:

Figure 3:
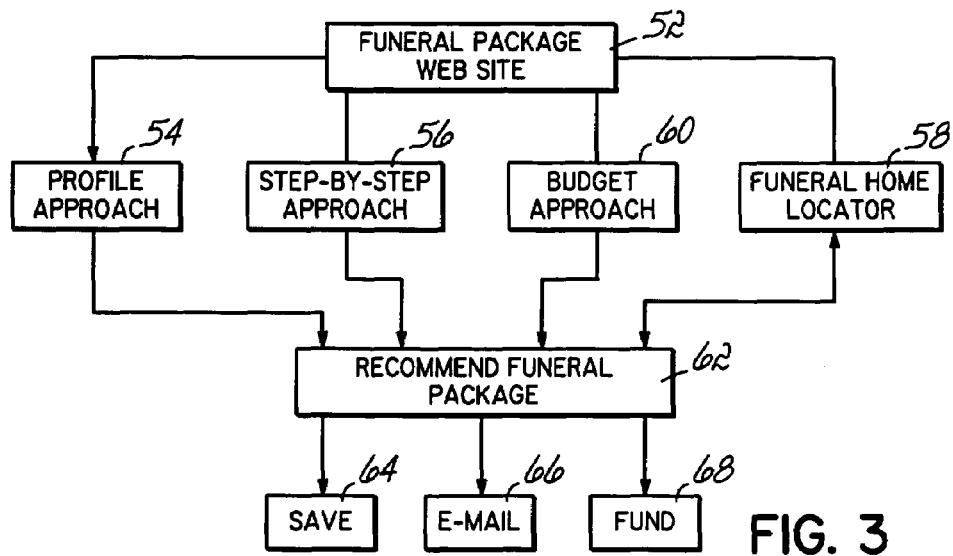
FIG. 3 is a flow chart illustrating one embodiment of a method of planning a funeral or other memorial service according to the principles of the present invention.
Figure 8:
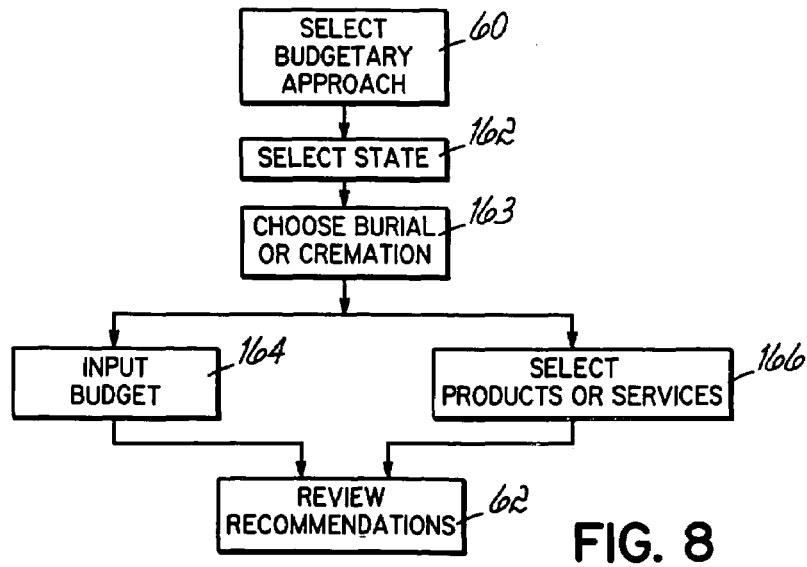

The flowchart of FIG. 8 illustrates steps intermediate to blocks 60 and 62 of FIG. 3 that are consistent with the principles of the present.

Figures 9, 10:
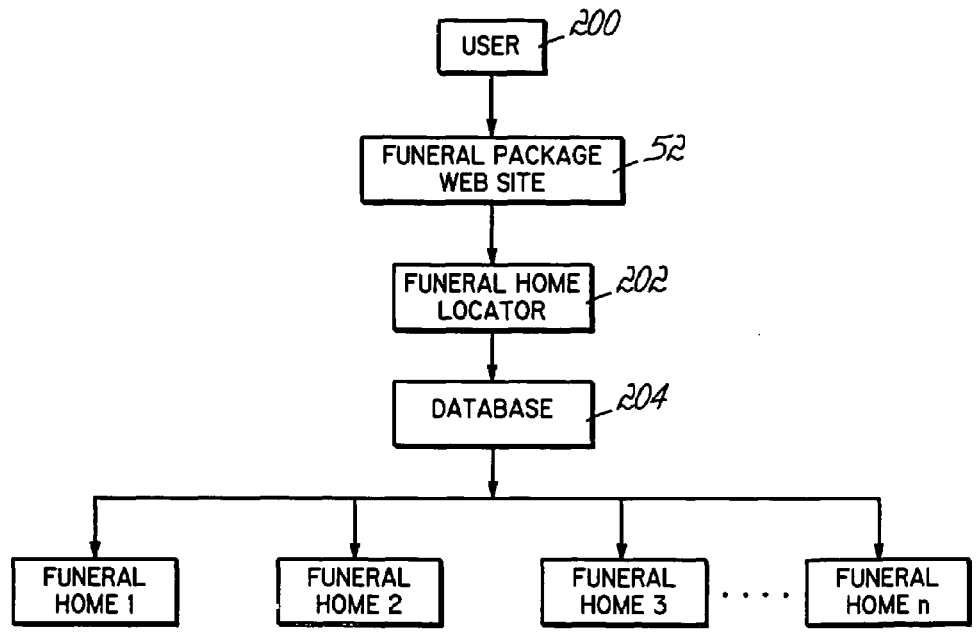

FIG. 9 is an exemplary browser window generated by the funeral plan website of FIG. 3.

FIG. 10 is a detailed block diagram of a process of the flow chart of FIG. 3.

DETAILED DESCRIPTION

The present invention relates to an apparatus, computer-implemented method and program product configured to arrange and fund a funeral. A program of the invention may receive user input requesting pricing and educational information associated with funeral products, services and homes. The program may receive and store such information from a plurality of product and service providers. In this manner, one embodiment of the invention consolidates the expertise, products and services of multiple funerary suppliers, providing a user with an extensive, competitive and diverse platform from which to plan a memorial service.

More particularly, the program may associate the user input with a budgetary, profile, step-based, or locator parameter. Each product, service and funeral home may share a database relationship with at least one such parameter. The program may retrieve pricing, educational and other information related to an implicated parameter in response to receiving the user input. Values assigned to the pricing information and located funeral homes may be mathematically scaled and rated to reflect a preference for preset user input or a provider product line. The program may initiate the display of the rated information for the perusal of the user. The user, in turn, may consider recommended items, collections or homes for incorporation into their funeral plan.

Hardware and Software Environment

Figure 1:
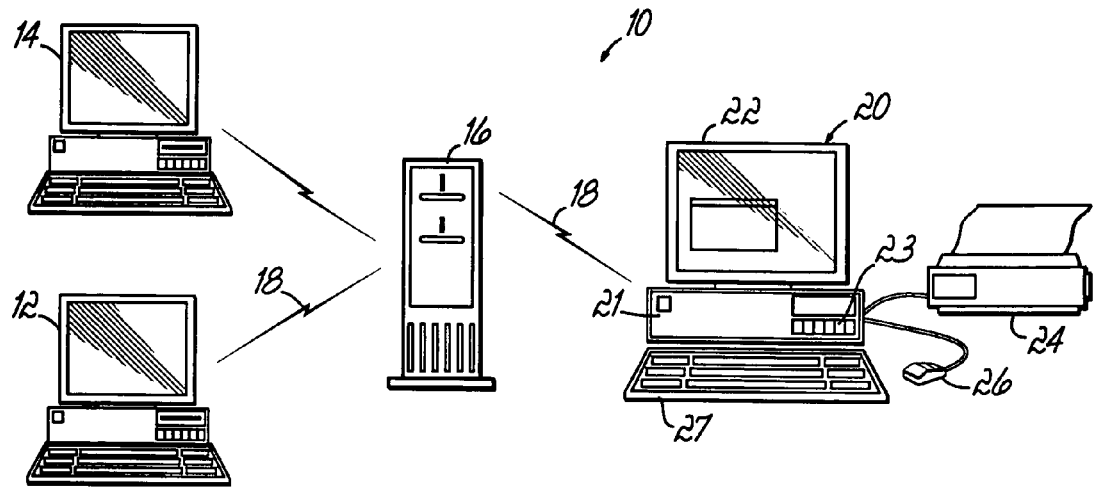
FIG. 1 is a block diagram of a networked computer system consistent with the invention.

Turning to the Drawings, wherein like numbers denote like parts throughout the several views, FIG. 1 illustrates a computer system 10 suitable for implementing online funeral planning in a manner consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 represents a networked interconnection, including, but not limited to local-area, wide-area, wireless, and public networks (e.g., the Internet). Moreover, any number of computers and other devices may be networked through network 18, e.g., multiple servers.

User computer 20, which may be similar to computers 12, 14, may include: a central processing unit (CPU) 21, a number of peripheral components such as a computer display 22, a storage device 23, a printer 24, and various input devices (e.g., a mouse 26 and keyboard 27), among others. Server computer 16 may be similarly configured, albeit typically with greater processing performance and storage capacity, as is well known in the art.

Figure 2:
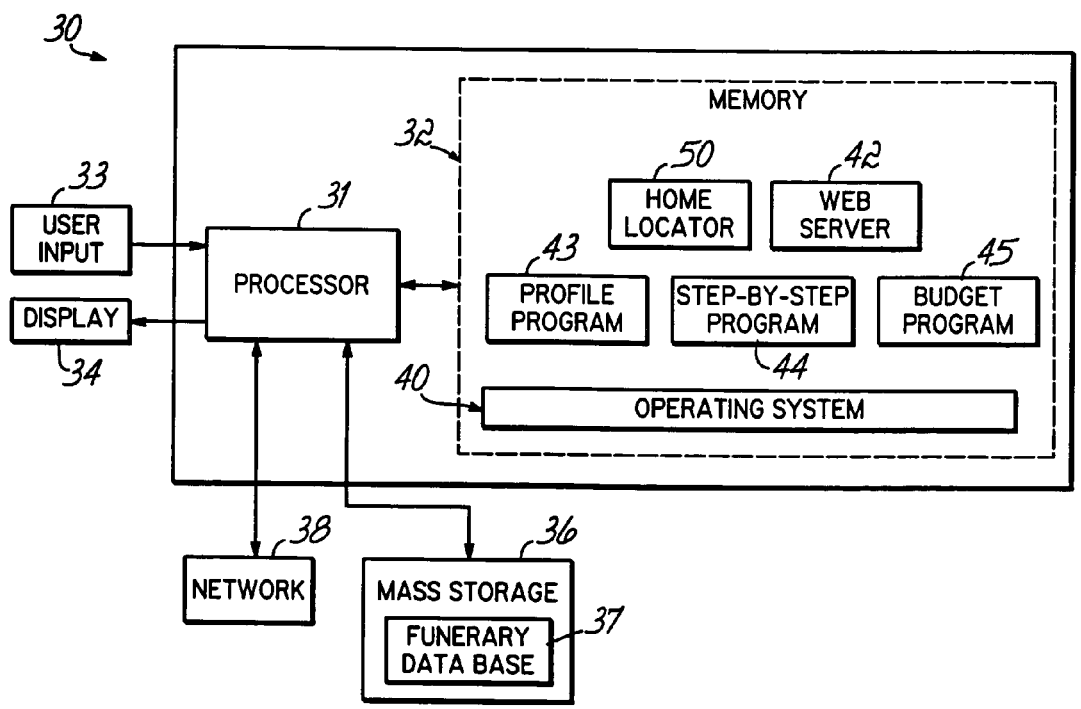
FIG. 2 is a block diagram of an exemplary hardware and software environment for a computer from the networked computer system of FIG. 1.

FIG. 2 illustrates a hardware and software environment for an apparatus 30 suitable for hosting an online funeral planning web site consistent with the principles of the invention. For the purposes of the invention, apparatus 30 may represent a computer, computer system or other programmable electronic device, including: a client computer (e.g., similar to computers 12, 14 and 20 of FIG. 1), a server computer (e.g., similar to server 16 of FIG. 1), a portable computer, an embedded controller, etc. Apparatus 30 will hereinafter also be referred to as a "computer," although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programnable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored within a funeral database 36 or on another computer coupled to computer 30 via network 38.

Computer 30 also may receive a number of inputs and outputs for communicating information externally. For interface with a user, computer 30 typically includes one or more input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, direct user input and output may not be supported by the computer, and interface with the computer may be implemented through client computer or workstation networked with computer 30.

For additional storage, computer 30 may also include one or more mass storage devices 36 configured to store a funeral database 37. Exemplary devices 36 can include: a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38.

Computer 30 operates under the control of an operating system 40, and executes various computer software applications, components, programs, objects, modules, etc. (e.g., funeral home locator 50, web server 42, profile program 43, step-by-step program 44, budget program 45, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs," or simply "programs." The computer programs typically comprise one or more instructions that are resident at various times in various computer memory and storage devices. When a program is read and executed by a processor, the program causes the computer to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Creating an Online Funeral Plan

The flowchart of FIG. 3 illustrates an exemplary embodiment for planning a funeral within the hardware/software environments of the first two figures. The flowchart depicts a sequence of method steps taken from the perspective of an online planner. In the illustrated embodiment, a program of FIG. 2 receives user input from a client. User input may be submitted via the web server of the same figure. The program may associate the user input with a budgetary, profile, or step-based parameter. Each parameter, in turn, may be paired with pricing and other information pertaining to a funerary item or set of funerary products and services. Each item or set shares a database relationship with the associated parameter. The central web server displays the pricing information after retrieving it from the funeral database of FIG. 2. The client may then consider the pricing information as they construct a funeral plan from among program recommendations.

Turning more particularly to FIG. 3, a user may access a funeral plan website via an Internet connection at block 52. Alternatively, funeral planning software and associated database structures may reside locally on the hardware of the user. In either case, a program of the embodiment may present the user with options that represent different funeral planning approaches. The approaches embody software routines that guide clients of varying priorities, finances and experience towards establishing a recommended funeral plan at block 62.

More specifically, the approaches are configured to elicit user input in a format that may be readily associated with an established parameter. A program, in turn, pairs the parameter with pricing information stored within the funeral database. The information may relate to a set of products, services and/or funeral homes. The database maintains the information such that data may be searched, matched and outputted in response to user input.

Figure 4:
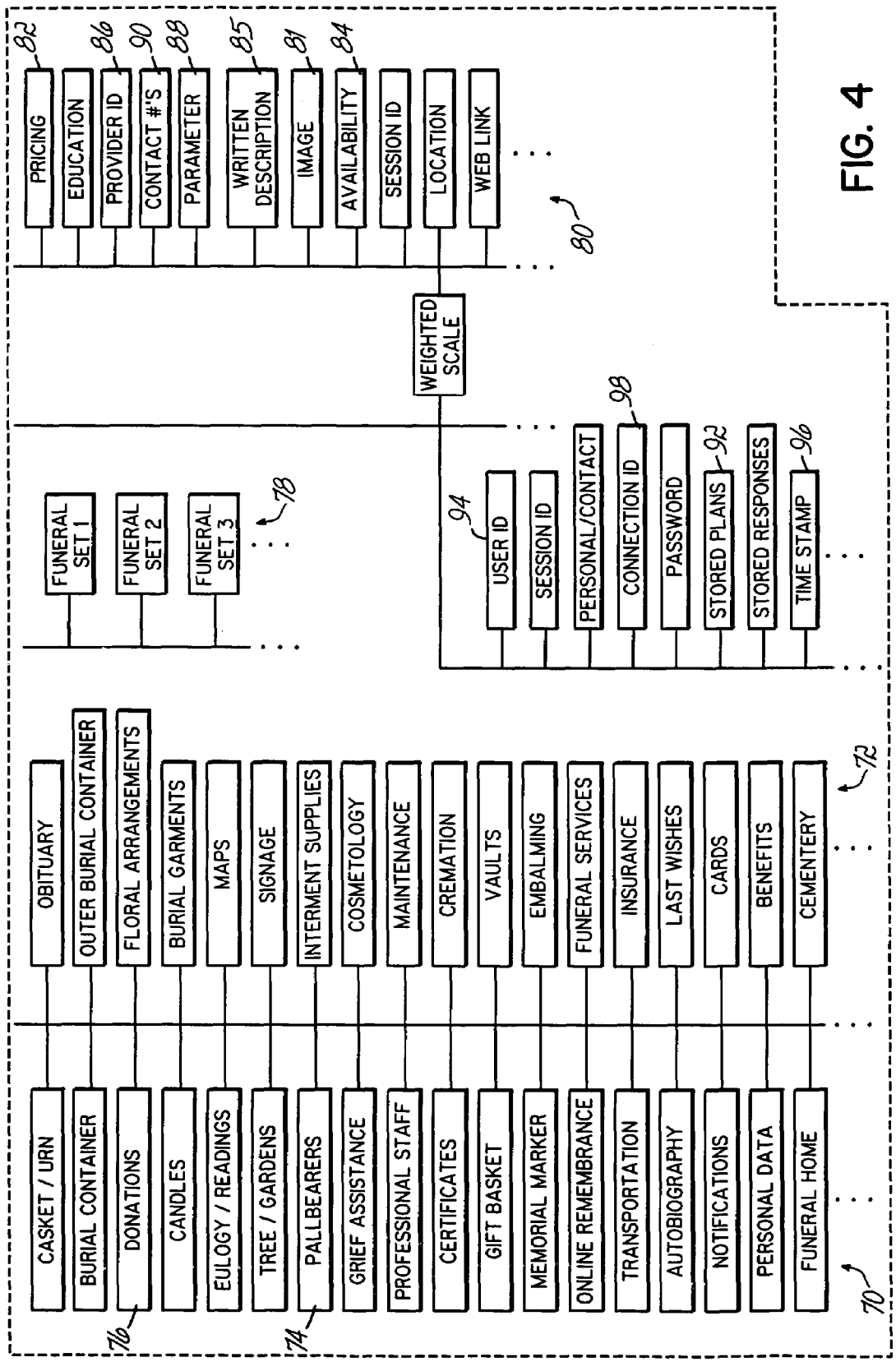
FIG. 4 illustrates a logical structure for the database of FIG. 2 that is consistent with the principles of the present invention.

FIG. 4 illustrates a logical structure for the exemplary funeral database of FIG. 2. The database embodiment stores information pertinent to exemplary product and service offerings, as well as to funeral sets, which comprise collections of such items. The database may additionally store a record of a user's interaction within a particular planning session.

The category blocks of columns 70 and 72 represent exemplary components of a funeral plan. The database may store information relating to the listed categories in manner that it may be readily associated and recalled in connection with user input. Each of the displayed blocks may hold the place of numerous fields omitted in the figure for space considerations. Nonetheless, it should be understood that each block within columns 70 and 72 could embody an exhaustive listing of specific products, services, organizational headers, and/or Internet links to funerary vendors. For instance, data stored in the place of the pallbearer category 74 may include fields configured to record the name, address and phone number of a designated pallbearer. Exemplary information stored by the database could also include the relationship shared between the pallbearer and a deceased. Similarly, stored donation fields 76 may embody a subclass, organ donation, which stores information pertaining to a donation organization, in addition to particular recordation of a decedent's donative intent. In any case, the listed categories do not limit the scope of the embodiment and are included only for exemplary purposes.

The database may additionally store funeral sets, as depicted in column 78. A program of the embodiment may group complementary products and services into such sets prior to a planning session. Sets may be comprehensive in scope, accounting for all aspects of a funeral plan. Other sets may contain incomplete fields. Such empty fields correspond to funerary aspects that may require additional user input to associate.

The products and services comprising a set may be associated based upon tradition, protocol, historical client preference, or financial and geographic considerations. Other items may be spontaneously associated into sets based solely upon user input. For instance, parameters or other fields may be associated as the user makes selections to create sets that are uniquely responsive to client preferences. Other sets may represent hybrid efforts, integrating unique client preferences with more conventional, established recommendations.

Still other products and/or services may be grouped into sets for display or educational purposes. For instance, an individual funeral home may maintain such a set for displaying an electronic catalog of products and services particular to the home. As such, the home, as a database user, can update the catalog information stored within the database. Such information may include Internet links or addresses that point to a website hosted by the funeral home.

The exemplary fields of column 80 embody recorded information concerning properties of the products, services or sets of columns 70, 72 and 78. The illustrated embodiment logically links each item/set of columns 70, 72, 78 to select fields of column 80. Some of the fields are merely informative or descriptive, such as those storing an electronic image 81 or written abstract 85 that concerns a column 70, 72, or 78 item. Other fields contain information used to store the price 82, availability 84 and originator 86 of the item. Still other fields record information configured to help a program of the embodiment associate the item or set with user input. For example, at least one parameter 88 may be linked by a program to each item and set. As discussed below in greater detail, the parameter may embody some budgetary, profile, locator or step-based criterion.

A program of the embodiment may use a parameter field 88 to recommend products, services and/or sets. In particular, the program may elicit input from a user in such a way that the user input reflects a parameter. The program then matches the indicated parameter to products, services and sets within the database that are linked to the same parameter. Parameters may be predetermined, and may embody nearly any characteristic that distinguishes one item or set from another. Some products, services and sets may share one or more parameter fields in common.

As such, the parameters fields form a network or index upon which a program may search the contents of the database. Namely, a known search algorithm may retrieve all items or sets having a parameter field indicated by the user input. In an alternative embodiment, a keyword search may be conducted on any other field associated with columns 70, 72, 78, such as on pricing information 82, to generate tailored recommendations.

To more accurately reflect client preferences, the relative weight of certain parameters may be manipulated to influence search results. For instance, a scaled value may be assigned to a parameter deemed critical to the client prior to conducting a search. Accordingly, a smaller value may be assigned to a parameter of lesser, relative importance. As such, the recommendations generated by the search algorithm should reflect a mathematical preference for the scaled parameter value and associated items/sets.

A list of the recommended items and sets may be generated and displayed for the perusal of the user. Recommendations may consist of a single, comprehensive set, a particular item, or may involve multiple sets and/or items. After evaluating the generated list of recommendations, the user may select a set/item for incorporation into a funeral plan. Alternatively, the user may discard the results of the search in favor of a new one.

The user may also choose to initiate the display of additional information that pertains to a selected recommendation. Such information may be retrieved from the database fields of column 80 and is not limited to descriptions, educational materials and pricing information. Further, the program may initiate the display of contact information 90 related to a death care professional connected to the selected item.

The user may store recommendations and other data retrieved from the database at any time during a planning session within memory 92 allocated by the program. Both complete and partial plans may be recorded within the database. Incomplete portions of partial plans may be left undecided, while other portions representing particular products/services are populated and electronically stored. The incomplete fields may alternatively be accommodated with a default selection, trigger the display of more information or queries, or may be left to complete at a later planning session. A single client may choose to generate and save more than one funeral plan, and may make deletions, insertions and/or other modifications at their discretion.

To facilitate retrieval of user data, the illustrated embodiment stores particulars from a planning session. User identification numbers 94, time stamps 96 and fields 98 indicating from where the user accessed the database may be populated along with user responses and saved recommendations/plans. A computer program may use such information to track, secure and categorize user information, as well as to determine user permissions within the database.

The structure of the illustrative database may be further configured to preserve the competitive integrity and autonomy of individual funeral homes. For instance, where a user accesses the central database through a host-funeral home website, only the pricing information 82 affiliated with the home may be matched and displayed. For instance, a program may identify from field 98 that a user has entered the database through a host-funeral home website. As such, recommendations may reflect a statistical or absolute preference for the pricing information of the funeral home. As above, the program may achieve the preference by disproportionately weighting parameter values associated with the home's identification field 86, or by limiting access to all but a subset of the database.

Profile Approach

Returning to FIG. 3, the information stored within the database structure of FIG. 4 may be associated with user input using programed planning approaches. Blocks 54, 56 and 58 of FIG. 3 represent three such exemplary approaches. For instance, the profile approach of block 54 elicits input in such a manner that it may be readily associated with a preconceived, profile parameter. The implicated parameter prompts recommendations of at least one funeral item or plan with which it is associated. Each recommended good or service meets or complements a profile criterion, or established preference. Thus, the program of the exemplary embodiment matches user input with a set of product and service recommendations that conform to the user's profile.

The profile approach streamlines the planning process by presenting a client with focused recommendations. The approach steers time conscious users towards more efficient planning. The approach also assists planners who possess only a vague or singular funerary preference by electronically displaying professional recommendations that may clarify or complement the preference. In either case, the program of block 54 guides a client through a series of questions/options used to generate a tailored profile.

For example, a software query at block 54 might ask a client if they are of a particular religious or ethnic persuasion. More specifically, the program may prompt, "Was the deceased of a particular faith tradition?" A list of common religious affiliations may be displayed for the client's consideration. The user may elect to skip the question, or select a proffered menu item using a keyboard, mouse, voice recognition device, or some other known means.

A religious or ethnic tradition, such as that presented to the client in the above scenario, often dictates certain aspects of a service. For instance, if an Islamic affiliation is indicated, then several special customs must be observed. Such customs include anointing and preparing the deceased with scented oils. Also, there is a strong preference for burials within the Moslem Community. The exemplary profile program capitalizes on known customs by developing and focusing the client's profile, accordingly. For instance, the exemplary program may present the client with a list of suitable mosques and affiliated preparatory services. Likewise, the electronic display of caskets deemed appropriate for Muslim services may be initiated for the user's consideration.

Figure 5:
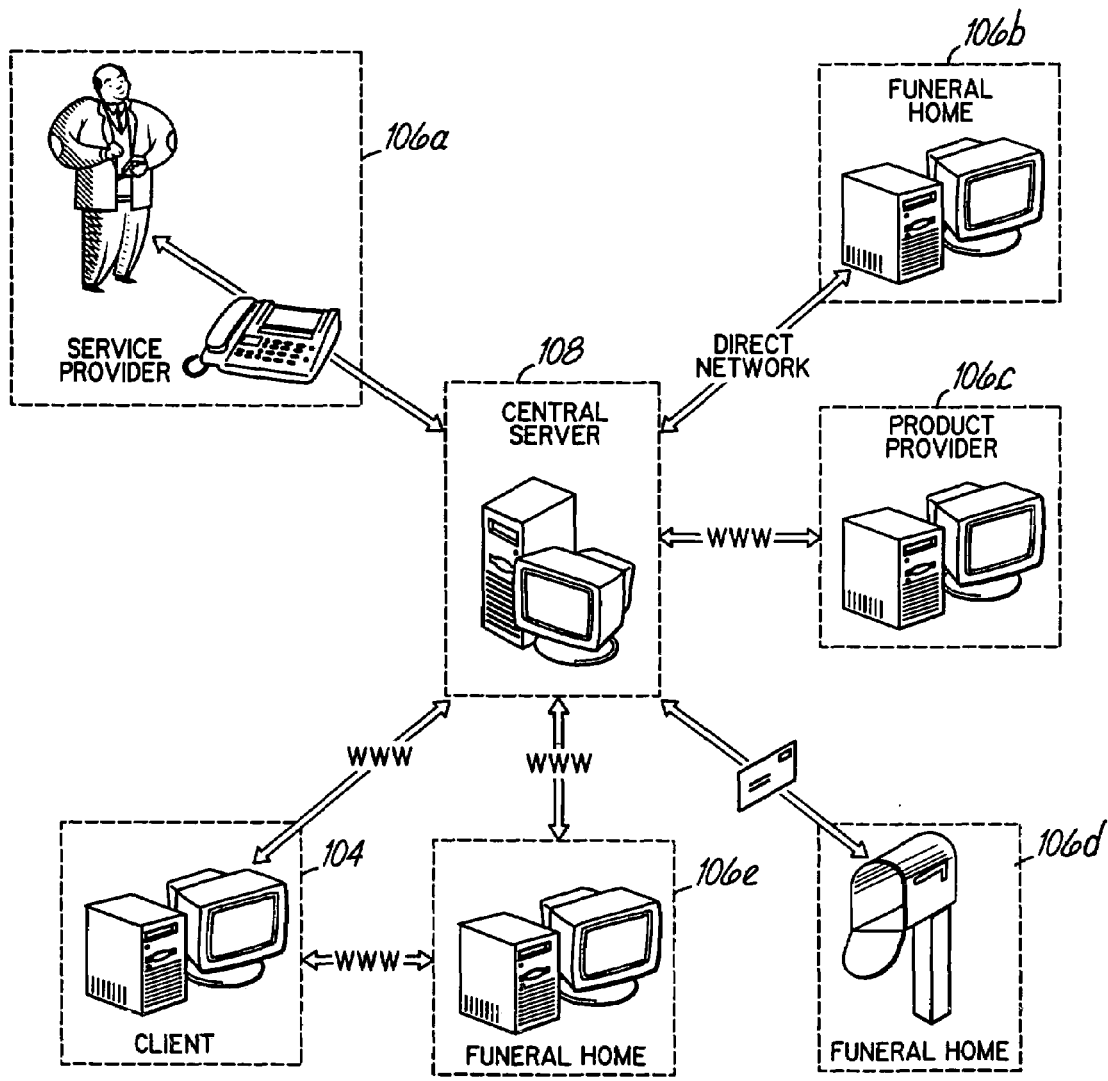
FIG. 5 is a schematic diagram illustrating a funeral planning session and associated communications network in accordance with the principles of the present invention.

To further illustrate the operation of the profile embodiment described herein, an exemplary planning session is depicted in the communications network of FIG. 5. Generally, a user 104 or provider 106a-e accesses a central server 108 directly over the Internet, or via a website of a participating funeral home 106b,e. Should the user 104 access the Internet through a funeral home website, a seamless link to the server 108 allows comprehensive planning without leaving the host-website. Alternatively, a funeral home or provider 106a-e accesses the funeral plan website of the server 108 on behalf of the client. From the funeral plan website, the client or representative submits user input as outlined in the above profile approach. The central database is searched, and a plan recommendation is presented.

Referring more specifically to FIG. 5, the client's computer terminal 104 interfaces with the central server 108. The Internet provides the communications link between the terminal 104 and server 108. Funeral homes and providers 106a-e submit information to the central database of the server 108 via Internet, telephone, computer and mail delivery mechanisms. Registration may be universally free, or have fees associated with different types of memberships.

For exemplary purposes, the user begins the planning session predisposed towards a coffin burial. In the figure, the client logs into a terminal 104 and accesses the funeral plan website maintained by the central server 108. The interactive program of the central server 108 enables the client to select a category, "burials," and/or a sub-category, such as "customization," from a scrollbar menu. Key words may alternatively be typed-in via user's keyboard. For instance, "burial, coffin and internal lining material" might prompt the central server 108 to search against the database for profile parameters related to those key terms. A profile parameter may additionally direct the display of a set of exemplary coffins configured to assist in establishing a preferred style or particular model of burial container.

The profile program may then prompt the client to consider services or products related to a selected coffin. For instance, the user may be asked to consider features that, in practice, are commonly associated with a recommended coffin model, such as decorative cap panels. A brief explanatory link may relate that such caps fit within casket lids to present an aesthetically pleasing appearance. Should the user choose to further investigate decorative caps, more specific features and images may be displayed at the terminal 104. For instance, the program may identify a particular style of cap embroidering that uniquely complements a selected coffin model. Similarly, the program may initiate the display of a cap designed as a keepsake.

At the discretion of the user, a decorative cap may be added to their plan. The client may alternatively elect to contact a sales representative, return to another menu, or end the session. The client may be prompted to consider other coffin features associated with a related profile criterion, such as a memorabilia drawer for storage and display.

Figure 6:
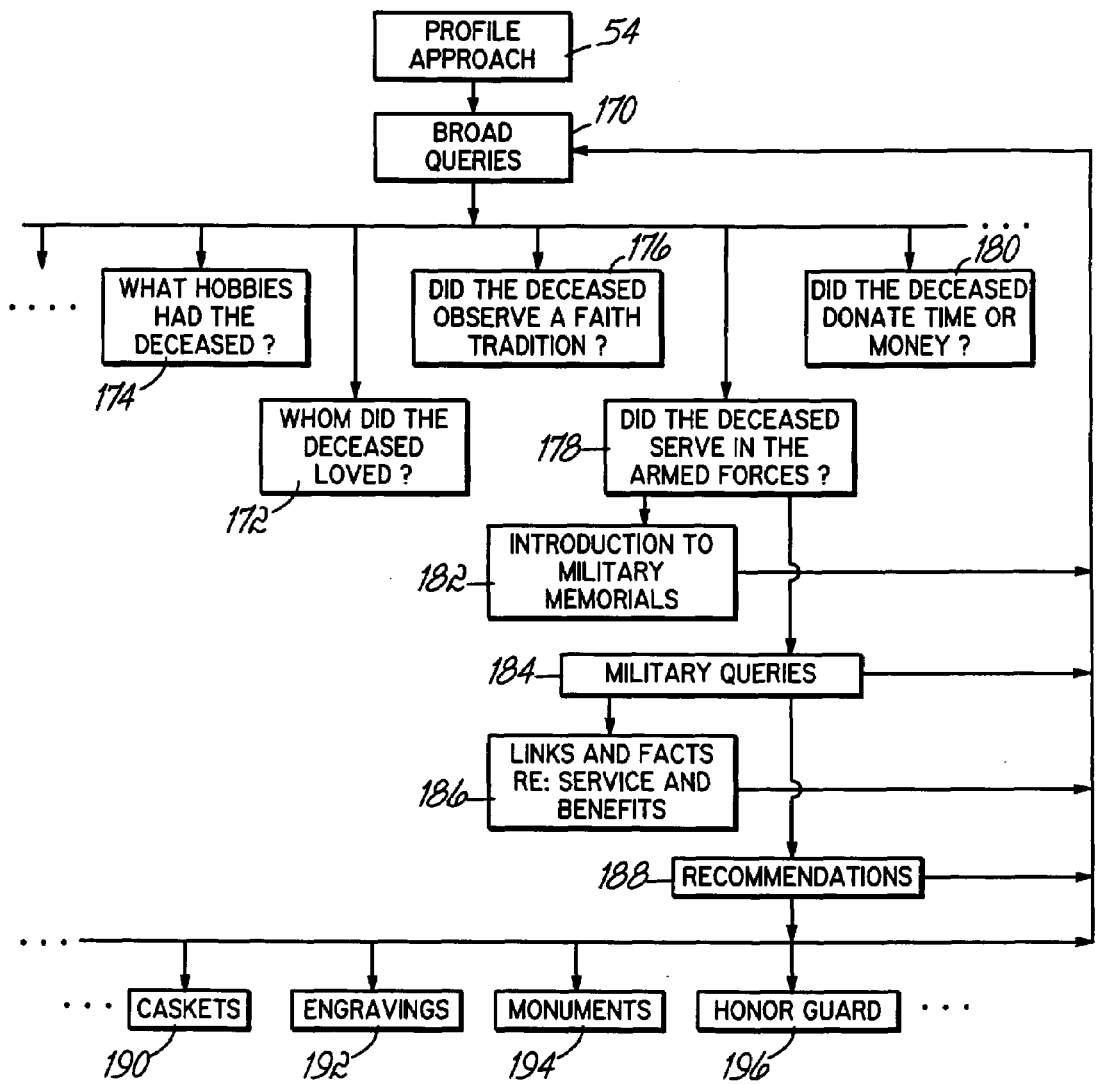
FIG. 6 is an exploded view of the profile approach block of FIG. 3.

Other exemplary profile queries pertain to pre-defined lifestyles. As such, user input may assist the planning software in making recommendations that honor a professional or personal characteristic of a deceased. For instance, an avid sportsman may wish to have a nature vignette displayed at viewing. Similarly, a military funeral may be appropriate to celebrate an aspect of a veteran's life. Such a scenario is depicted in the flowchart of FIG. 6. At blocks 172-180, a series of exemplary queries are posed to the client. User responses may prompt more specific questions or recommendations. Such questions and subsequent profile sequences may be configured differently depending upon which query from among blocks 172-180 the user answers.

For instance, a user may respond affirmatively to a question at block 178. In response, the program presents an explanation of the potential relevance of military service at block 182 in the context of funeral services. The presentation may be in multimedia format and may generally express benefits, requirements and other considerations pertinent to military funerals. Exemplary considerations could include the playing of Taps and the presentation of the American flag.

At block 184, the program may present a series of additional military-related questions. For instance, an inquiry may be made as to branch of service. The rank of the deceased may be typed-in, or selected from a pull-down menu. Because rank designation can vary between different branches of the Armed Forces, the displayed menu may reflect the field of rank appropriate to the branch designated at block 184. Other queries solicit serial/social security numbers, dates of enlistment/discharge and alternative names used during service. Where appropriate, responses could be forwarded to a representative in order to ascertain and initiate potential government benefits.

At any time, the client is free to return to the broad questions of block 170, investigate the explanatory information of block 186, or review the recommendations of block 188. Should a user elect to view the material of block 186, they are presented with detailed information regarding military ceremonies, including historical data and popular customs. Links to other educational websites may also be offered.

At block 188, the profile program initiates the electronic display of products and services appropriate for a military funeral. Should the user desire information or explanations regarding the recommendations, links to blocks 190-196 may be accessed. For instance, information displayed at block 190 explains that while any casket may be acceptable for most military ceremonies, a silver-colored, steel one is most common. Data at block 192 relates to engraving the symbol of the Armed Forces branch into the casket. The program expounds upon the traditions underlying bronze, flat grave markers at block 194, while honor guard considerations are addressed at block 196. The program further displays information regarding burial allowances, gun salutes and memorial certificates. As with the profile approach, recommendations may be saved, discarded, or added to a funeral plan at block 188. Alternatively, the program may further query the user at block 170.

Demographic questions provide further insight into developing profiled funeral recommendations. Preferences relating to personal hobbies, beliefs and keepsakes may aid the program in recommending suitable memorial items from those compiled in the database. Still other profile queries may relate to cemetery plots, visitation services, photos, family records, grief assistance and monuments.

The profile approach may also address such important details as obituaries, death certificates, transportation and donation arrangements. All of the above queries act to narrow the field of potential funeral plan choices, allowing the user to populate their plan from among a focused set of recommendations. Thus, the profile approach can expedite the matching a profiled, user criterion, such as a burial preference, with associated products, services and funerary providers 106.

Step-By-Step Approach

Returning again to FIG. 3, other clients may prefer more guidance and educational perspective than offered by the profile approach of block 54. Alternatively, a step-by-step approach may be utilized at block 56. This approach systematically guides the client through the funeral planning process. More particularly, the step-based program organizes user input into a format readily associated with an established step-based parameter. The program, in turn, associates the parameter with a funerary product/service or educational link with which it is associated. All recommended goods, services and/or information relate to the parameter and a common client preference, or step-based criterion.

Notably, the step-by-step approach coordinates program queries and options with related educational data. For instance, a client evaluating cemetery plots may contemporaneously be presented with a link espousing burial options and facts. User input entered via a keyboard or computer mouse may automatically initiate the display of related information, along with an associated good or service. A common step-based parameter may implicate both the displayed educational information and a product/service. Program recommendations and/or further queries may be accompanied with explanations including answers to commonly asked questions. The client may then review the recommendations and educational materials, enabling informed choices.

The step-based format is especially suited for relatively inexperienced or curious clients who are unfamiliar with death care processes. Similar to the profile approach, the step-based approach may prompt a user to input responses or select steering options. Program questions may be more broadly posed than with the profile approach. Morever, the questions of block 56 are accompanied with explanations and educational links. The client may steer the order of the step-based process by clicking on a presented general topic, such as "Burial and Cremation" or "Ceremonies."

Figure 7:
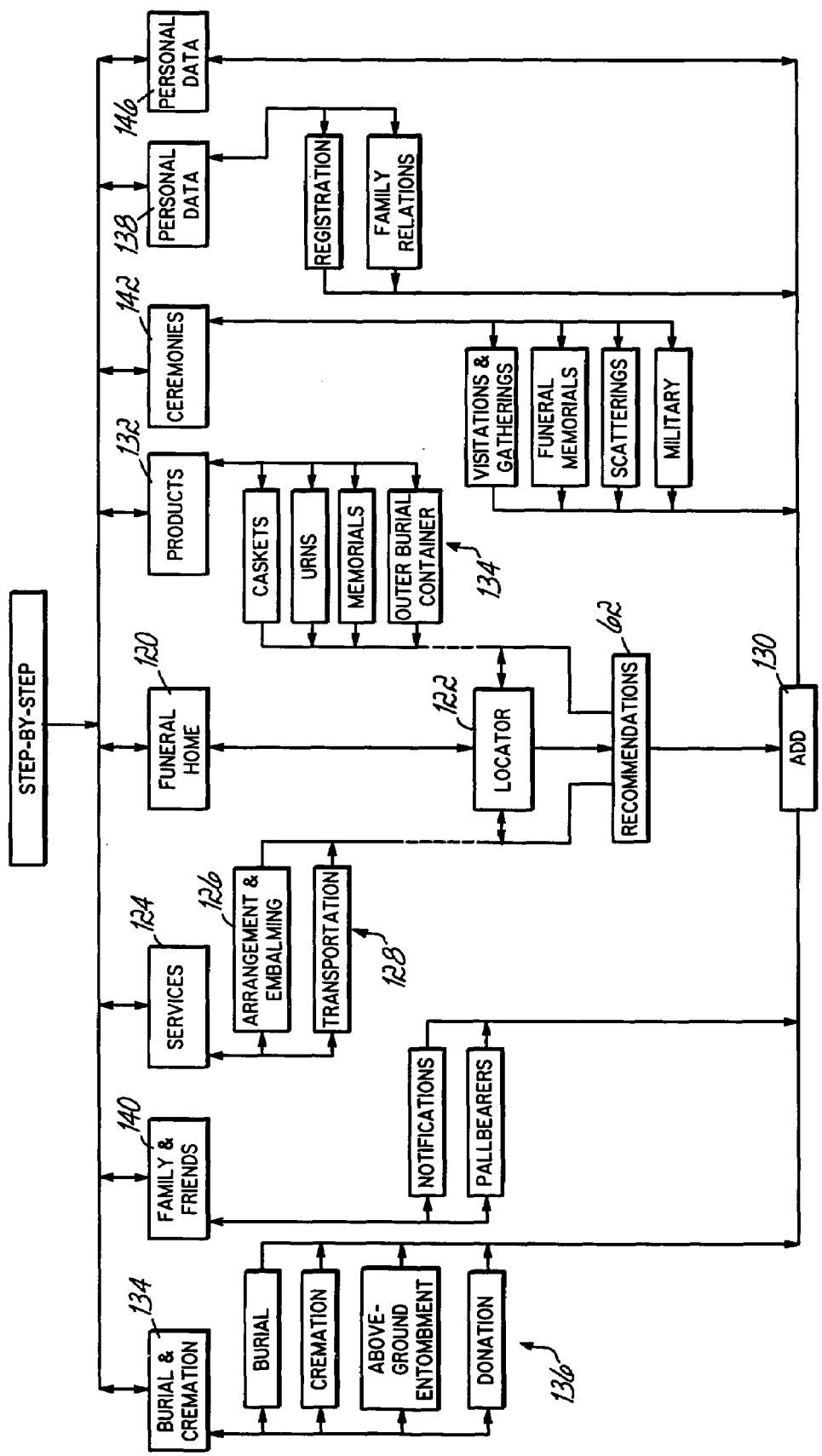
FIG. 7 illustrates a logical structure for the step-by-step program block of FIG. 3.

An exploded view of one exemplary implementation of block 56 is shown in FIG. 7. The figure further showcases the comprehensive scope of products, services, and other planning options available via the embodiment. The step-by-step program may initially present the user with a listing of funeral plan topics 120, 124, 132, 134, 138, 140, 142 and 146. Each topic may categorically embody a potential aspect of a funeral plan. The user may select from any of the displayed topics appealing to a particular interest, preference or plan disposition. The step-by-step program may link each topic to queries and information configured to inform the user, while assisting in the development of their plan.

For instance, a user may select the funeral topic, "Funeral Home," at block 120. In response, the program may present the user with text explaining the significance of a funeral home, as well as helpful selection criteria. The format of the program may prompt the user to select a funeral home using a locator program at block 122. Though discussed below in detail, the funeral home locator program may search the funeral database for a home conforming to a user-stated geographic or service preference. A user predisposed to a particular funeral home may alternatively add the home to their funeral plan via block 122.

Other users may prefer to begin their step-by-step session by evaluating available services at block 124. As with block 120, the program may initially present the user with educational information pertinent to funerary services and providers. Exemplary text and images may pertain to licensing requirements for certain types of services. Selection of block 124 may further initiate the display of more specific service categories, denoted by blocks 126 and 128. For instance, a user may inquire of transportation services at block 128. In response, the program may present the user with background information relevant to funerary transportation.

If the user has previously selected a funeral home at block 122, then a display of procession options and associated costs may be initiated at block 62. At block 62, the program accesses pricing information and other recommendations from the database that are specific to the designated funeral home. If a user at block 128 has not yet added a funeral home to their plan, then the program may direct them to select one at block 122 prior to proceeding to the recommendations of block 62. The provider-specific nature of block 62 may require such formality and structure to provide meaningful cost representation. The architecture of the embodiment may further allow service providers to access the database in order to self-administrate their own offerings, catalogs and pricing information.

Product providers may similarly maintain their own product-related pricing information for items categorized under block 132. A user wishing to access such information at block 132 may be first presented with generalized information concerning funerary products. The program may display more specific product categories, such as those illustrated in column 134, for the perusal of the user. As with the service-planning route of block 124, a user may be required to select a funeral home at block 122 prior to accessing the specific pricing information of block 62. As discussed below in greater detail, block 62 offers the user pricing and product selections that may be added to a funeral plan at block 130.

Other features of the step-by-step program may not require the user to have previously designated a funeral home. For example, block 134 may prompt a user to register a preference from among the "Burial and Cremation" categories of column 136. User responses may be directly stored within a plan at block 130. Similarly at blocks 138 and 140, the program may incorporate plan input relating to personal and contact information, respectively. Planning options pertinent to different types of ceremonies may likewise be initiated through block 142. As above, the step-by-step program may infuse the data of block 142 and its associated subcategories with educational and contact information. As such, an informed user may directly input preferences into their plan at block 130. In another embodiment, column 144 data may be linked to the ceremonial services of a specific funerary provider.

At any time, the user may view their complete or partial plan at block 146. More particularly, the user's selection of block 146 may initiate an itemized display of all funerary products and services comprising a current funeral plan. The display may include pricing and other information. The user may add, delete, or otherwise modify any portion of their plan at their own discretion. By design, nearly all of the funeral plan topics addressed by the step-by-step program may be developed independently from other funerary topics. This architecture may enable a user to incrementally develop an informed funeral plan during shorter, more manageable sessions.

Budget Approach

A different planning approach at block 60 of FIG. 3 may appeal to budget conscious clients. Some clients may have strict budgetary constraints and consequently prefer to examine the planning process from a financial perspective. As with the above approaches, software queries may promote tailored recommendations. User input is now associated with a budgetary parameter, and at least one embodiment recommends a funeral product or plan based upon that parameter.

More specifically, the budget approach of block 60 promotes the entry of user input in a format that can be readily associated with the an established budgetary parameter. Exemplary budgetary parameters may include household income, as well as insurance and/or geographic considerations. The implicated parameter may initiate recommendations for at least one product/plan with which it is associated. Each good, service or plan assembled in a recommendation is included because it meets or complements a budgetary criterion, or requirement. Thus, the program of the exemplary embodiment matches user input with a set of recommendations that conform to the budget of the client.

Using the budget approach, a program algorithm weighs the recommendation criteria toward costs. For instance, a client investigating caskets may be prompted to enter demographic or income data, as well as an expectant price range. Software then compiles a list of products or services from the central database that have data fields conforming to the user input. A budgetary program may assign values to the data fields that the program may mathematically manipulate based upon the user input. Thus, the program uses the weighted values to recommend funeral plans appropriate to the unique resources of the client, based on the user input, financial models and other studies.

FIG. 8 illustrates process steps associated with an exemplary planning session using the budgetary approach. The flowchart reflects the planning embodiment from the perspective of a user. At block 60, the user opts to begin or continue their planning from a budgetary perspective. For instance, the user may be asked to input the state or city where the funeral will be held at block 162. Questions phrased to ascertain the location of the memorial service may aid the software in estimating funeral costs specific to a locale, as prices of geographically-diverse products and services can vary dramatically.

The funeral program may search the funeral database for product and services in response to the user's selected locale. For instance, the program may buffer information relating to products and services having a database field that corresponds to an indicated state. The state-specific data may populate tables within the buffer. The buffer may arrange the data within the tables such that pricing information may be searched and retrieved as described above. In addition, or alternatively, pricing information particular to the state may be retrieved directly from central data base. In either case, subsequent planning recommendations and steering options generated within the budgetary approach may reflect a statistical preference for the tabled pricing information.

Block 163 of the exemplary budgetary approach may prompt the user to indicate a preference for either "burial" or "cremation." Because the response of the user may dictate certain product recommendations, the user input facilitates the program's retrieval of product pricing information. As above, the budgetary program may impute user input from other planning sessions to more efficiently search memory files. Of note, the budgetary program may allow users to initiate the budgetary approach with the product inquiry of block 163, then continue on with other options at 164 and 166. Depending on the predisposition, interest level and available time of an online planner, the user may directly proceed from block 163 to product/service-based selections of block 166.

For instance, the budgetary program may present the user with an option of evaluating the tabled information with regard to a stated budget. More particularly, a program of the embodiment may query the user with regard to their expectant budget at block 164. Alternatively, the client may be prompted to confidentially enter the amount of their monthly income. Other program queries may offer the user choices that are not tied to a specific monetary figure. For instance, the program may allow the user to highlight text reading, "I want to spend as little as possible," or "I am willing to spend whatever it takes to have a nice service." In either case, the program may generate or associate a proposed funeral budget for the user based upon the indicated phrase or entered salary/estimate figure.

The user may elect to review at block 62 a display of recommended products, services and sets implicated by the budget-specific input of block 164. More specifically, the program may initiate a display of pricing information from among the buffered, or otherwise stored listings of state-specific services. Such recommendations may comprise comprehensive funeral plans assembled based upon tradition, protocol and/or historical client preference. User input entered in the course of any other planning approach or session may also be reflected in the block 62 recommendation. Preferably, however, a user will choose to further focus their planning session prior to block 62 by considering additional service and product planning options offered through the budgetary program.

For instance, block 166 represents another planning option associated with the budgetary approach. The user may access block 166 immediately after indicating a memorial preference at block 163. As such, the program may present the user with a listing of funerary products and services appropriate to either a burial or a cremation, per the user input of block 163. Of note, the listing may also account for geographic limitations specified by the user at block 162. The listing of services may further incorporate a range of prices associated with each product and service.

Should the user access block 166 after submitting budget-related input at block 164, displayed products and services may reflect the input of block 164 in addition to the service-related data of block 166. In either instance, the user may select a displayed service, such as embalming or transportation. As shown in FIG. 8, the user may proceed directly to view recommendations at block 62, or may first consider or review other planning via associated with block 164. As discussed above in detail, block 62 presents the user with an interactive display of recommendations and pricing information that corresponds to the user input gleaned by the budgetary program.

To further assist the client, the program may make financier contact information available via the website, as well as informative links and money saving suggestions. As with the other approaches included in FIG. 3, the resources of block 60 may be accessed confidentially at the client's leisure to help generate a suitable list of recommendations at block 62.

Funeral Home Locator

Still other users may prefer to begin their planning experience by first locating a suitable funeral home. Proximity and available services are just two criteria with which such a client may conduct a search at block 58 of FIG. 3. As seen in an exemplary browser of FIG. 9, a user may initiate a location sequence by indicating an acceptable search radius at a data entry field 198. The radius may originate from a specific location, such as a cemetery or a decedent's home.

Known mapping software may be augmented with compiled funeral home locations to present a list of homes to the client. Alternatively, a user may already know the name of a preferred funeral home. Such a client may type-in the name of a recommended home to receive an address and/or service-listing. In either case, the locator program generates a display of homes conforming to the user input.

After reviewing the presented funeral homes, the client may select a listed home to initiate the display of additional information. Such information may relate to arranging a personal interview with a director, or linking to a website maintained by the home. The client may also choose to peruse available services and products affiliated with the home. Similarly, a funeral director of another home can use the embodiment to locate memorial items that satisfy their client requirements.

A funeral home may be added to a plan at the discretion of the user. Similarly, select products or services of a listed home may be incorporated into a plan, with other aspects of the plan left blank or populated with items gleaned from other searches/approaches. Other approaches, such as the step-by-step approach, may incorporate the funeral locator program as an integral component of a recommendation process. In either case, information concerning the located funeral home is stored along with other funerary data in a recommended plan. At any time, complete or partial plans may be saved or discarded, and the funeral plan website may be book-marked and recalled at the convenience of the client.

As implied above, the funeral home locator may be employed in conjunction with any of the above planning approaches. For instance, the locator may be employed only after the profile approach generates a partial plan at block 54 of FIG. 3. In such a scenario, the established profile parameters of the plan drive the criteria of the funeral home search. Such an application could be initiated by the user, or may be conducted automatically after a product or service is recommended.

FIG. 10 is a block diagram illustrating a funeral home locator application that is consistent with the principles of the present invention. Turning to the figure, a user 200 accesses the funeral plan website 52 of FIG. 3. The locator program 202 of the embodiment queries the user 200 regarding desired services and geographic requirements. For instance, a search based upon a state or zip code entry may be initiated by the user. Additionally, the user 200 may require a funeral home with a parking lot capacity adequate to accommodate a handle a large crowd. Another user may desire on-site religious services or grief counseling for loved ones.

The locator program transmits user input to a locator at block 202 that processes the request. Namely, a central database comprised of participating funeral homes at block 204 is searched according to client criteria. The funeral homes may have previously submitted answers to the software queries, and those answers populate fields in the central database 204. Ultimately, the locator program 202 may rate the database funeral homes according to user input. One embodiment disproportionately weights selective user input and so as to be more influential. As discussed above in detail, the locator program may assign scaled values to parameters and other database fields associated with the user input. Smaller values may be assigned to other fields of relatively lesser, stated importance. For instance, if user input indicates that proximity is twice as important to the client as cosmetology services, then a scaled value assigned to a distance database field may be twice that of a cosmetology field.

Search results may additionally account for supplier considerations and attributes. For instance, the locator program at block 202 may rate and order funeral homes based upon whether the homes carry a product or service affiliated with a particular funerary vendor. Such a scenario may be appropriate where a provider sponsors portions of the website. As such, recommendations may reflect a statistical preference for funeral homes having database fields corresponding to services or items associated with the supplier. For example, one embodiment may favor a funeral home that offers funding through an insurance policy proffered by the sponsor.

Another scenario might generically favor funerary providers based upon their adaptability to the embodiment. For instance, recommendations may demonstrate a preference for homes postured to avail themselves of the website architecture. For example, the above, exemplary enterprise structured to offer online funding using insurance, trusts, credit, etc., may appear near the top of a recommendation list due to its compatibility with respect to the confines of the program. Such preferences might generally encourage the participation of vendors and homes having services conforming to the structure of the embodiment.

Program algorithms may further manipulate the scaled values to determine which homes best reflect the user input/ supplier considerations. The program may then display an ordered list of those homes on the client's computer monitor. As described above, the user may select from among the listed homes to obtain additional information, such as contact data or a seamless link to the web page of the home. A user may alternatively choose to submit contact information, themselves.

Of note, none of the above planning approaches are mutually exclusive. In fact, a single planning session may incorporate aspects of two or more of the discussed approaches. For instance, a client using the step-by-step approach may seamlessly transition to the profile approach 54 of FIG. 3. Likewise, the budgetary approach 60 may be used in tandem with the locator approach 58 to establish an appropriate plan.

Furthermore, one skilled in the art can readily envision the inclusion of planning approaches other than the exemplary, categorical ones discussed herein. For instance, a cemetery locator program may elicit and process user input to generate a display of establishments that conform to submitted search criteria. The program could operate in a manner analogous to the funeral home locator. Morever, the discussed approaches are not intended to limit the scope of the invention, but are rather demonstrative of any planning approach programmed to elicit formatted user input.

Recommendation Selection

All approaches of FIG. 3 conclude at block 62, where the client is presented with an interactive display of stored recommendations that correspond to elicited client preferences. In one embodiment, recommendations comprise comprehensive funeral plans. In another, recommendations consist of individual products and services. Such recommended products or services may be selected for incorporation into a funeral plan, or discarded in favor of another session. The client may choose to temporarily skip particular aspects of their plan, or use default values.

In either case, the user may be presented with additional questions and options configured to promote a more personalized and financially appropriate plan. A single client may choose to generate and save more than one plan, and may make deletions, insertions and/or other modifications at their convenience. At any point, the user may receive information on how to personally contact a funerary professional associated with a recommendation.

All selections may be saved into a personal file at block 64. The file may be completed and updated at the convenience of the client. Funeral plans may be continuously changed, deleted, or even copied by approved family members. At block 66, plans may be printed, posted on websites, or emailed to friends. Electronically-stored photographs or computer generated images relating to prospective plans may be displayed to clients. Stored funeral plans and personal information may be secured using known techniques such as password and encryption technologies.

As alluded to above, recommendations may vary according to different embodiments. For instance, in another embodiment clients may be prompted to register contact and payment information with the central server prior to receiving recommendations. Unique identifiers, such as USERID's, are assigned to each client, one of which is illustrated as being connected to central server via the computer terminal. USERID's are also assigned to funerary providers. In this embodiment, user input may take the form of an offer, and may indicate the maximum amount of compensation that a provider can expect to receive for a product or service. The date and time that such a request expires may also be included.

The user input may be transmitted via numerous means, including a Worldwide-web interface, electronic mail, wireless device, voice mail, facsimile, or postal mail. Standard legal provisions and language may be integrated with the user input to "fill in the gaps" at central server. The central server may require that the user provide a credit card or other financial account number. Steps may be taken to evaluate the credit or financial status of the client.

Returning to FIG. 5, potential funerary vendors 106 may also access the control server 108 to browse user input/offers. Such input may be electronically stored and displayed categorically. A program may allow vendors 106 to conduct a keyword search on the title of a user input entry or to its entirety. Potential death care providers may regularly access the server to search for relevant input, or alternatively, the server 108 may provide an automatic notification service based upon criteria previously defined by each funerary provider 106. Such criteria may include any parameter, category, key word, or other criterium described herein. The server 108 may save the criteria used in a provider 106 search for future automatic notifications.

Responses from funerary providers 106 may be communicated to the user 104 via electronic mail, website posting, wireless device, facsimile or postal service. One embodiment of the invention allows a user to review evaluative data that rates a prospective funerary vendor. Such data may be compiled from consumer articles and former client satisfaction surveys.

Still another embodiment allows vendors to bid for the business of the client. For instance, a client could indicate an interest in a candle/floral arrangement, then wait for electronic offers. Upon receiving the bids, the user decides whether to include the vendor's item in the funeral plan. Clients 104 and death care professionals may engage in asynchronous negotiation through server 108 to arrive at a final, negotiated price. Synchronous communication, e.g., online chat or voice transmittal over telephone connections, may also assist in the brokering of recommendations.

Funding

The costs of selected plans, products and services are compiled and listed at block 62. Prices of unselected items may also be included in estimates. As discussed above, the client is not obligated to purchase a plan/item and may choose to merely discard or save the recommendation. However, should a client elect to purchase a funeral plan or product online, the price of certain items and services may be guaranteed by vendors. The costs of other items, such as catering and floral services, may remain uninsurable due to the funeral providers limited control over them. Nonetheless, software may still initiate the activation of an interest bearing account designated for such items.

Funding options maybe presented to users at block 68 of FIG. 3. Options may include electronic checks, credit purchases, payment plans, established trusts, prepayment incentives and insurance purchases. Financial consultants and additional funding information may be accessed through the website to resolve client questions. Once purchased, the payment status of a funeral plan may be checked online at a password protected web link.

Those skilled in the art will readily recognize numerous adaptations and modifications which can be made to the present invention that will result in an improved method of planning funerals and other memorial services, yet all of which will fall within the spirit and scope of the present invention as defined in the following claims. Accordingly, the invention is to be limited only by the scope of the following claims and their equivalents

What is claimed is:

1. A computer-implemented method for creating an online funeral plan, the method comprising:
generating a profile including a plurality of profile parameters, wherein the plurality of profile parameters are related to a personal funerary preference and a lifestyle of a decedent, and the lifestyle of the decedent is associated with a profession of the decedent;
generating a plurality of groupings of products and services each associated with a profile parameter of the plurality of profile parameters;
receiving user input associated with a grouping of products and services of the plurality of groupings of products and services to obtain requested pricing information on a product or service offered by a selected funeral service provider among a plurality of funeral service providers;
retrieving in response to the user input the requested pricing information by accessing a database storing pricing information associated with the grouping of products and services associated with the profile parameter and offered by the plurality of funeral service providers, wherein the grouping of products and services are preselected to complement each other and complete aspects of funeral planning, and to individually and collectively accord with the profile parameter that relates to the personal funerary preference and the lifestyle of the decedent, wherein each funeral service provider is associated with a distinct set of products and services from the plurality of products and services, and wherein the database maintains pricing information for the set of products and services associated with each funeral service provider;
steering generation of the funeral plan according to the profile parameter that relates to the personal funerary preference and the lifestyle of the decedent by prompting user selections from the grouping of products and services associated with the profile parameter;
outputting the requested pricing information to the user; and
wherein the generating the profile, generating the plurality of groupings, receiving user input, retrieving, steering, and outputting steps are implemented by executable software stored in a computer.

2. The method of claim 1, further comprising selecting a funeral service provider from the plurality of funeral service providers in response to the user input.

3. The method of claim 2, further comprising selecting the funeral service provider from a plurality of funeral homes based on criteria chosen from the group consisting of: location, services, products, capacity, pricing information, appearance and reputation.

4. The method of claim 1, further comprising receiving user input from the user to select a collection of products and services to include in the funeral plan.

5. The method of claim 1, wherein the steering of the generation of the funeral plan further comprises personalizing aspects of the funeral plan to reflect a religious, professional, personal, or ethnic desire of a deceased in accordance with the user profile parameter and in response to user input.

6. The method of claim 1, further comprising storing contact information of a family member, friend or associate of the user for notification of a decedent's death.

7. The method of claim 1, further comprising electronically storing the funeral plan for later retrieval.

8. The method or claim 1, further comprising modifying the funeral plan in response to user input.

9. The method of claim 1, further comprising directing user input to a web site, and communicating the pricing information for a products or service to the user via the web site, wherein the pricing information is retrieved from the database.

10. The method of claim 1, wherein the pricing of a product or service is guaranteed, the method further comprising initiating a display to the user of an electronic image or text representing terms of the guarantee.

11. The method of claim 1, further comprising initiating the display of an image representative of the product or service to a user.

12. The method of claim 1, further comprising scheduling a meeting with a death care professional in response to user input.

13. The method of claim 12, further comprising initiating the display of contact information to the user enabling personal or electronic communication with the death care professional.

14. The method of claim 1, further comprising retrieving an estimated cost from the database for a non-guaranteed item.

15. The method of claim 14, wherein the non-guaranteed item is selected from the group consisting of: a floral arrangement, musical performance, clergy, transportation and honorarium costs.

16. The method of claim 1, further comprising initiating the display of a payment status of the funeral plan to the user.

17. The method of claim 1, wherein the pricing information includes bids from at least a subset of the plurality of funeral service providers.

18. The method of claim 1, further comprising relating an offer for the product or service from the user to at least a subset of the plurality of funeral service providers, wherein the offer includes a price range.

19. The method of claim 1, further comprising associating and recommending to the user a complementary item from the plurality of products and services in response to the user selecting the product or service.

20. The method of claim 1, further comprising initiating the display of educational information, counseling and Internet links related to the product or service.

21. The method of claim 1, further comprising verifying the availability of the product or service from among the plurality of funeral service providers.

22. The method of claim 1, further comprising encrypting user data and funeral plan information in conjunction with creating the funeral plan.

23. A program product, comprising:
a program configured upon execution to:
generate a profile including a plurality of profile parameters, wherein the plurality of profile parameters are related to a personal funerary preference and a lifestyle of a decedent, and the lifestyle of the decedent is associated with at least one of a profession of the decedent or a hobby of the decedent;
generate a plurality of groupings of products and services each associated with a profile parameter of the plurality of profile parameters;
receive user input associated with a grouping of products and services of the plurality of groupings of products and services to obtain requested pricing information on a product or service offered by a selected funeral service provider among a plurality of funeral service providers;
retrieve in response to the user input the requested pricing information by accessing a database storing pricing information associated with the grouping of products and services associated with the profile parameter and offered by the plurality of funeral service providers, wherein the grouping of products and services are preselected to complement each other and complete aspects of funeral planning, and to individually and collectively accord with the profile parameter that relates to the personal funerary preference and the lifestyle of the decedent, wherein each funeral service provider is associated with a distinct set of products and services from the plurality of products and services, and wherein the database maintains pricing information for the set of products and services associated with each funeral service provider;
steer generation of the funeral plan according to the profile parameter that relates to the personal funerary preference and the lifestyle of the decedent by prompting user selections from the grouping of products and services associated with the profile parameter; and output the requested pricing information to the user; and
a recordable, computer-readable medium storing the program.

24. The program product of claim 23, wherein the medium is selected from among the group comprising a volatile memory device, a non-volatile memory device, a removable disk, a hard disk drive and an optical disk.

25. The program product of claim 23, wherein the medium resides on a hardware system of the user.

26. A computer-implemented method for creating an online funeral plan, the method comprising:
generating a plurality of budgetary parameters, wherein the plurality of budgetary parameters is indicative of at least one of an expectant budget for the plan, an income associated with a user, a geographic consideration, or an insurance consideration:
generating a plurality of groupings of products and services each associated with a budgetary parameter of the plurality of budgetary parameters, wherein each product and service in the groupings of the plurality of groupings of products and services is included because it meets or complements a budgetary criterion or requirement associated with the budgetary parameter;
receiving user input associated with a grouping of products and services of the plurality of products and services to obtain requested pricing information on a product and/or service offered by a selected funeral service provider among a plurality of funeral service providers;
retrieving in response to the user input the requested pricing information by accessing a database storing pricing information associated with the grouping of products and services associated with the budgetary parameter and offered by the plurality of funeral service providers, wherein the grouping of products and services are preselected to further complement each other and complete aspects of funeral planning, wherein each funeral service provider is associated with a distinct set of products and services from the plurality of groupings of products and services, and wherein the database maintains pricing information for the set of products and services associated with each funeral service provider;
steering generation of the funeral plan according to the budgetary parameter of the plurality of budgetary parameters by prompting user selections from the grouping of products and services associated with the budgetary parameter;

outputting the requested pricing information to the user; and wherein the generating the plurality of budgetary parameters, generating the plurality of groupings, receiving user input, retrieving, steering and outputting steps are implemented by executable software stored in a computer.

27. The method of claim 26, further comprising selecting a funeral service provider from the plurality of funeral service providers in response to the user input.

28. The method of claim 27, further comprising selecting the funeral service provider from a plurality of funeral homes based on criteria chosen from the group consisting of: location, services, products, capacity, pricing information, appearance and reputation.

29. The method of claim 26, further comprising processing funding of the funeral plan using a payment method selected from the group consisting of: an electronic debit, credit card, insurance, or trust fund.

30. The method of claim 26, further comprising personalizing aspects of the funeral plan to reflect a religious, professional, personal, or ethnic desire of a deceased in response to user input.

31. The method of claim 26, further comprising storing contact information of a family member, friend or associate of the user for notification of a decedent's death.

32. The method of claim 26, further comprising initiating the electronic display of the funeral plan on a web site.

33. The method or claim 26, further comprising modifying the funeral plan in response to user input.

34. The method of claim 26, wherein the pricing of a product or service is guaranteed, the method further comprising initiating a display to the user of an electronic image or text representing terms of the guarantee.

35. The method of claim 26, further comprising initiating the display of an image representative of the product or service to a user.

36. The method of claim 26, further comprising scheduling a meeting with a death care professional in response to user input.

37. The method of claim 36, further comprising initiating the display of contact information to the user enabling personal or electronic communication with the death care professional.

38. The method of claim 26, further comprising retrieving an estimated cost from the database for a non-guaranteed item.

39. The method of claim 38, wherein the non-guaranteed item is selected from the group consisting of: a floral arrangement, musical performance, clergy, transportation and honorarium costs.

40. The method of claim 38, further comprising storing a currency value indicative of client funds that are budgeted to pay for the non-guaranteed item.

41. The method of claim 26, further comprising storing information related to donations.

42. The method of claim 26, further comprising initiating the display of a payment status of the funeral plan to the user.

43. The method of claim 26, wherein the pricing information includes bids from at least a subset of the plurality of funeral service providers.

44. The method of claim 26, further comprising relating an offer for the product or service from the user to at least a subset of the plurality of funeral service providers, wherein the offer includes a price range.

45. The method of claim 26, further comprising associating and recommending to the user a complementary item from the plurality of products and services in response to the user selecting the product or service.

46. The method of claim 26, further comprising initiating the display of educational information, counseling and Internet links related to the product or service.

47. The method of claim 26, further comprising verifying the availability of the product or service from among the plurality of funeral service providers.

48. The method of claim 26, further comprising encrypting user data and funeral plan information in conjunction with creating the funeral plan.

49. The method of claim 26, wherein the plurality of budgetary parameters is indicative of an expectant budget for the plan.

50. The method of claim 26, wherein the plurality of budgetary parameters is indicative of an income associated with the user.

51. The method of claim 26, wherein the plurality of budgetary parameters is indicative of a geographic consideration.

52. The method of claim 26, wherein the plurality of budgetary parameters is indicative of an insurance consideration.

53. A program product, comprising:
a program configured upon execution to:
generate a plurality of budgetary parameters, wherein the plurality of budgetary parameters is indicative of at least one of an expectant budget for funeral plan, an income associated with a user, a geographic consideration, or an insurance consideration;
generate a plurality of groupings of products and services each associated with a budgetary parameter of the plurality of budgetary parameters, wherein each product and service in the groupings of the plurality of groupings of products and services is included because it meets or complements a budgetary criterion or requirement associated with the budgetary parameter;
receive user input associated with a grouping of products and services of the plurality of products and services to obtain requested pricing information on a product and/or service offered by a selected funeral service provider among a plurality of funeral service providers;
retrieve in response to the user input the requested pricing information by accessing a database storing pricing information associated with the grouping of products and services associated with the budgetary parameter and offered by the plurality of funeral service providers, wherein the grouping of products and services are preselected to further complement each other and complete aspects of funeral planning, wherein each funeral service provider is associated with a distinct set of products and services from the plurality of groupings of products and services, and wherein the database maintains pricing information for the set of products and services associated with each funeral service provider;
steer generation of the funeral plan according to the budgetary parameter of the plurality of budgetary parameters by prompting user selections from the grouping of products and services associated with the budgetary parameter; and output the requested pricing information to the user; and
a recordable, computer-readable medium storing the program.

54. A computer-implemented method for creating an online funeral plan, the method comprising:
generating a profile including a plurality of profile parameters, wherein the plurality of profile parameters are related to a personal funerary preference and a lifestyle of a decedent, and the lifestyle of the decedent is associated with a hobby of the decedent;

generating a plurality of groupings of products and services each associated with a profile parameter of the plurality of profile parameters;

receiving user input associated with a grouping of products and services of the plurality of groupings of products and services to obtain requested pricing information on a product or service offered by a selected funeral service provider among a plurality of funeral service providers;

retrieving in response to the user input the requested pricing information by accessing a database storing pricing information associated with the grouping of products and services associated with the profile parameter and offered by the plurality of funeral service providers, wherein the grouping of products and services are pre-selected to complement each other and complete aspects of funeral planning, and to individually and collectively accord with the profile parameter that relates to the personal funerary preference and the lifestyle of the decedent, wherein each funeral service provider is associated with a distinct set of products and services from the plurality of products and services, and wherein the database maintains pricing information for the set of products and services associated with each funeral service provider;

steering generation of the funeral plan according to the profile parameter that relates to the personal funerary preference and the lifestyle of the decedent by prompting user selections from the grouping of products and services associated with the profile parameter;

outputting the requested pricing information to the user; and wherein the generating the profile, generating the plurality of groupings, receiving user input, retrieving, steering, and outputting steps are implemented by executable software stored in a computer.

55. The method of claim 54, further comprising selecting a funeral service provider from the plurality of funeral service providers in response to the user input.

56. The method of claim 55, further comprising selecting the funeral service provider from a plurality of funeral homes based on criteria chosen from the group consisting of: location, services, products, capacity, pricing information, appearance and reputation.

57. The method of claim 54, further comprising receiving user input from the user to select a collection of products and services to include in the funeral plan.

58. The method of claim 54, wherein the steering of the generation of the funeral plan further comprises personalizing aspects of the funeral plan to reflect a religious, professional, personal, or ethnic desire of a deceased in accordance with the user profile parameter and in response to user input.

59. The method of claim 54, further comprising storing contact information of a family member, friend or associate of the user for notification of a decedent's death.

60. The method of claim 54, further comprising electronically storing the funeral plan for later retrieval.

61. The method or claim 54, further comprising modifying the funeral plan in response to user input.

62. The method of claim 54, further comprising directing user input to a web site, and communicating the pricing information for a products or service to the user via the web site, wherein the pricing information is retrieved from the database.

63. The method of claim 54, wherein the pricing of a product or service is guaranteed, the method further comprising initiating a display to the user of an electronic image or text representing terms of the guarantee.

64. The method of claim 54, further comprising initiating the display of an image representative of the product or service to a user.

65. The method of claim 54, further comprising:
scheduling a meeting with a death care professional in response to user input; and
initiating the display of contact information to the user enabling personal or electronic communication with the death care professional.

66. The method of claim 54, further comprising retrieving an estimated cost from the database for a non-guaranteed item selected from the group consisting of: a floral arrangement, musical performance, clergy, transportation and honorarium costs.

67. The method of claim 54, further comprising associating and recommending to the user a complementary item from the plurality of products and services in response to the user selecting the product or service.

* * * * *

UNITED STATES PATENT AND TRADEMARK OFFICE
CERTIFICATE OF CORRECTION

PATENT NO.        : 7,552,070 B2                                    Page 1 of 1
APPLICATION NO. : 09/827803
DATED             : June 23, 2009
INVENTOR(S)       : Torres et al.

It is certified that error appears in the above--identified patent and that said Letters Patent is hereby corrected as shown below:

Column 2, lines 62-63, change "principles of the present" to --principles of the present invention--.

Column 4, line 4, change "programnable" to --programmable--.

Column 12, line 49, change "associated with the an" to --associated with the--.

Column 14, line 21, change "other planning via associated with" to --other planning associated with--.

Column 14, line 46, change "may type-in the name" to --may type in the name--.

Column 15, line 21 and 22, change "accommodate a handle" to --accommodate or handle--.

Column 17, line 52, change "options maybe presented" to --options may be presented--.

Column 18, line 66, change "method or claim 1," to --method of claim 1,--.

Column 19, line 3, change "for a products" to --for a product--.

Column 20, line 36, "insurance consideration:" to --insurance consideration;--.

Column 21, line 29, change "method or claim" to --method of claim--.

Column 24, line 14, change "method or claim" to --method of claim--.

Column 24, line 18, change "a products or" to --a product or--.

Signed and Sealed this

Twenty-third Day of November, 2010

David J. Kappos
*Director of the United States Patent and Trademark Office*